(No Model.)
2 Sheets—Sheet 1.
A. C. HAWES.
DUPLEX HORSESHOE.
No. 334,658. Patented Jan. 19, 1886.
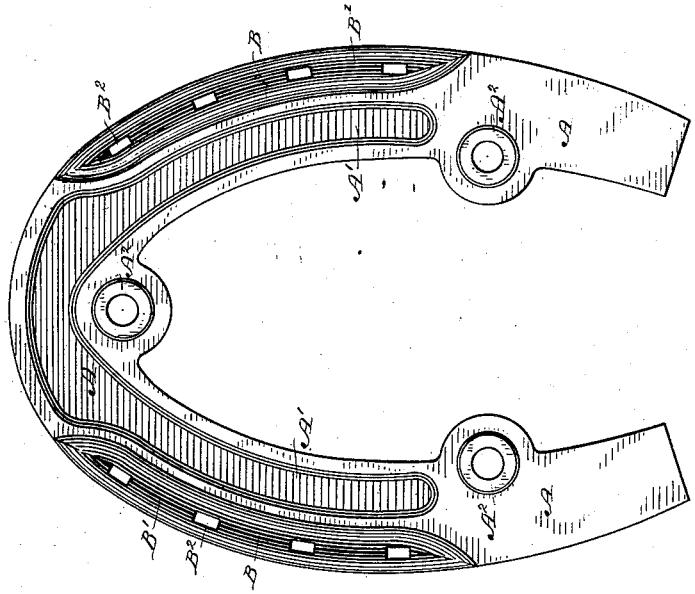
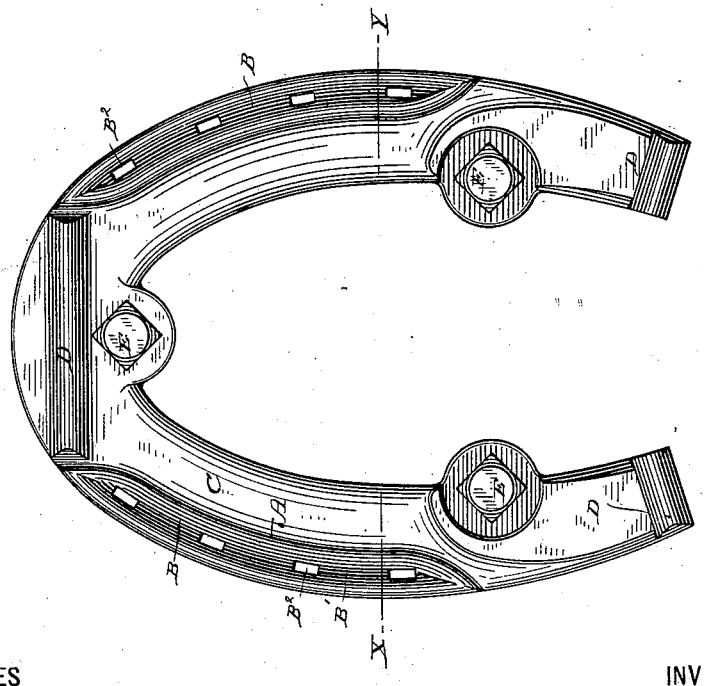
WITNESSES
Ed. A. Newman.
Al. C. Newman.
INVENTOR
Arnold C. Hawes,
By his Attorneys
Baldwin, Hopkins, & Peyton.

(No Model.) 2 Sheets—Sheet 2.
A. C. HAWES.
DUPLEX HORSESHOE.
No. 334,658. Patented Jan. 19, 1886.
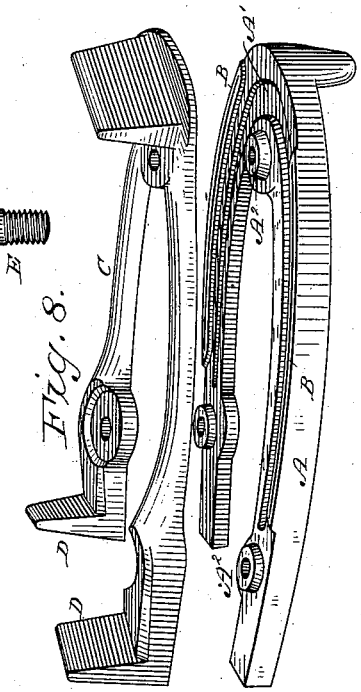
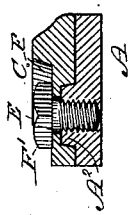
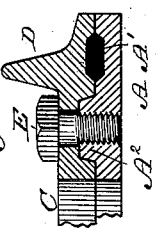
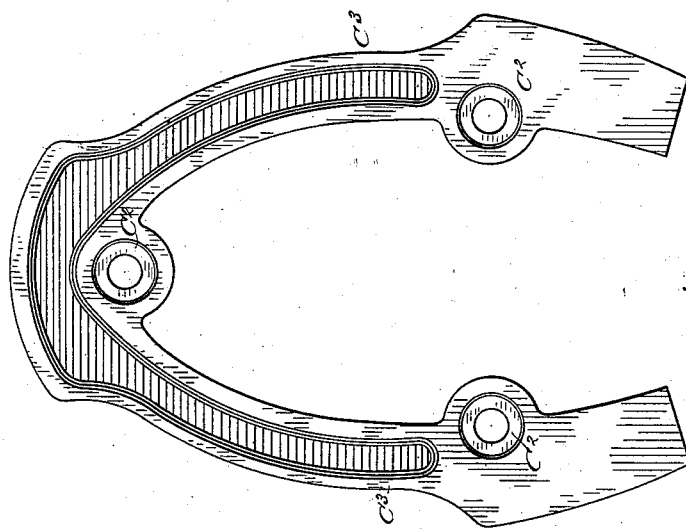
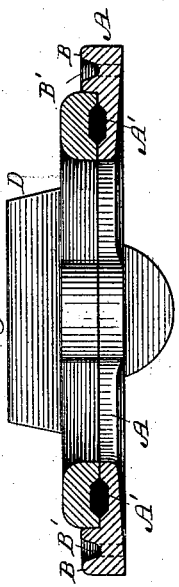
WITNESSES
Ed. A. Newman.
Al. C. Newman.
INVENTOR
Arnold C. Hawes,
By his Attorneys
Baldwin, Hopkins, & Peyton.

UNITED STATES PATENT OFFICE.

ARNOLD C. HAWES, OF NOROTON, CONNECTICUT.

DUPLEX HORSESHOE.

SPECIFICATION forming part of Letters Patent No. 334,658, dated January 19, 1886.

Application filed July 16, 1885. Serial No. 171,772. (No model.)

*To all whom it may concern:*

Be it known that I, ARNOLD C. HAWES, of Noroton, Fairfield county, Connecticut, have invented certain Improvements in Duplex Horseshoes, of which the following is a specification, reference being made to the accompanying drawings.

The object of my invention is, by certain new combinations and methods of construction, to provide an improved duplex horseshoe, which, while possessing the desirable qualities peculiar to this type of shoe, shall also possess strength, durability, and solidity equal to that of the common horseshoe, and which shall also equal the latter in convenience and ease of application to the foot, and exceed it little, if any, in weight.

A duplex horseshoe consists, essentially, of two parts, one, which I term the "hoof-plate," adapted to be nailed to the hoof or foot of the horse, and the other, which I term the "shoe-plate," adapted to be securely fastened to the hoof-plate and arranged to be detached from the latter at will.

The object sought in this double or duplex construction of the horseshoe is to permit the easy and economical renewal of the lower or shoe plate, which receives the wear, without the necessity of drawing the nails by which the whole shoe is attached to the hoof and subjecting the latter to the injury incident to the driving of new nails through it. Such shoes are most valuable for use in cold climates during the winter season, when it becomes necessary to frequently replace shoes with dulled calks by sharp ones to prevent horses from slipping. The duplex shoes, however, have other elements of usefulness and economy which make them desirable in many cases for use in all climates and in all seasons.

A good duplex shoe must possess at least two features—viz., separability of the two parts composing the shoe and solidity of these parts when united. The more nearly this solidity approximates to that of a solid shoe the more perfect will be the construction. This object I have sought in the invention herein described, in which the interlocking and attachment of the two parts of the shoe are such as to give the maximum degree of solidity, while at the same time the construction secures lightness and provides for an extended base upon the calks and for the application of the shoe to the foot of the horse with as much convenience as in the case of the common shoe.

Referring to the drawings, Figure 1 is a representation of the under side of my complete duplex horseshoe. Fig. 2 shows the under side of the hoof-plate, the shoe-plate being detached; and Fig. 3 shows the upper side of the shoe-plate removed from the hoof-plate. Fig. 4 is a cross-section of the two plates on the line X Y of Fig. 1. Fig. 5 is a sectional view taken through the center of the toe-bolt, and Fig. 6 represents a similar view through the center of one of the heel-bolts. Fig. 7 is a view of one of the bolts. Fig. 8 is a perspective view of the two parts of the shoe, one over the other and a little separated.

Corresponding letters refer to similar parts in the several figures.

A is the hoof-plate, having on each of its outer edges the flanges B, raised above its surface sufficiently to give a proper lateral support to the shoe-plate, and containing the nail-grooves B' and the nail-holes $B^2$. The hoof-plate may also, if desired, be paneled or grooved, as at A', for the purpose of lightening its weight, and may be provided with circular bosses $A^2$, which are internally screw-threaded to engage the fastening-bolts E.

C is the shoe-plate, provided with the ordinary toe and heel calks D, which are integral with it, or secured to the shoe-plate in any suitable manner. The shoe-plate may, if desired, be paneled or grooved, as shown in Fig. 3, in order to lessen its weight.

$C^2$ are recesses in the upper side of the shoe-plate corresponding with and fitting over the bosses $A^2$ on the hoof-plate. The external edges of the shoe-plate are so formed at the part marked $C^3$ as to neatly coincide with and fit against the raised flanges on the hoof-plate. The exact shape of these external edges of the shoe-plate is not essential, except that it must so conform to the flanges upon the hoof-plate as to cause the two plates to properly register together when united, and thus assist in giving them solidity.

In Fig. 5 A is the hoof-plate, and C is the shoe-plate, the interlocking of the bosses A² and the recesses C² being clearly indicated. In this case the head of the screw projects below the surface of the shoe-plate C.

In Fig. 6 the same parts are shown, with the addition of a raised surface, F, which wholly or in part surrounds the head of the bolt F', thus protecting the latter from injury and assisting, by the compacting of dirt in the socket thus formed, to prevent the bolt from unscrewing. The toe-bolt, as shown in Fig. 1, is arranged in the manner illustrated by Fig. 5, and the heel-bolts as illustrated by Fig. 6.

Fig. 7 shows the form of screw-bolt which I prefer, its square or polygonal head acting, in conjunction with the surrounding socket, to keep the bolt from unscrewing, as explained above.

The general appearance of the hoof-plate corresponds to that of a common horseshoe, except that on the under surface of the hoof-plate I provide a raised flange or rib on each of the external edges of the plate. I am thus enabled, if desired, to use a thin hoof-plate, to which I give proper stiffness, by these ribs or flanges at its outer edges, at the points where it chiefly needs stiffness, and where it would otherwise be weakened by the nail-holes. Within these ribs or flanges on the hoof-plate are formed nail-holes and grooves, or nail-holes only, protection thus being obtained for the heads of the nails by which the plate is attached to the foot of the horse.

A raised flange on the external edge of a horseshoe is not broadly new; but an important feature in my invention consists in interrupting or stopping these flanges at the toe of the shoe and discontinuing them for some distance at the heels, so as to leave a flat surface on the hoof-plate extending to the extreme outer edge of the latter, both at the toe and at the heels, whereby I obtain the best possible bearing for the shoe-plate, and permit the extreme extension of the latter at the toe and at the heels, so as to give as broad a bearing as possible for the foot of the horse. These raised flanges serve also the additional purpose of assisting in the registering together of the two plates of the duplex shoe and of preventing their relative displacement when in use.

The first feature of my invention consists, therefore, in a hoof-plate to which I give increased strength and stiffness by raised flanges at the points where it would otherwise be weakened by the nail-holes, thus materially diminishing the thickness and weight of the hoof-plate, and at the same time providing a protection for the heads of the nails, and which is so constructed as to afford bearings for the shoe-plate at the toe and at the heels, separated as widely as the size of the shoe permits, and giving as broad a base to the foot as can be obtained by a horseshoe of the common construction.

It will be seen that the flanges on the hoof-plate have two functions—one affecting the hoof-plate only by giving it increased strength and stiffness, and the other affecting both the hoof-plate and the shoe-plate by serving to determine their proper relative positions.

In my improved duplex horseshoe this hoof-plate having raised flanges is combined with a shoe-plate the flanks of which are so cut away as to conform to the inner contour of the flanges of the hoof-plate, whereby the two plates are registered together, and at the same time the nail-holes in the hoof-plate are not overlapped by the shoe-plate, and are thus at all times accessible. In this way, also, any moderate projection of the nail-heads is unobjectionable, and in no way interferes with the putting together of the two plates of the shoe.

The general shape of the shoe-plate conforms to that of the hoof-plate, except that on its two outer edges the flanks are cut away, so as to be counterparts of the raised flanges on the hoof-plate, and to thus fit neatly against and between the latter, which thus assist in registering the two plates together and in preventing the sliding of the lower plate upon the upper one. The lower or shoe plate is also shaped so as to leave uncovered that portion of the hoof-plate which contains the nails, thus making the latter accessible, whether the two plates are united or separated, the object being to enable the shoe to be nailed to the foot, or broken nails to be replaced, without separating the shoe-plate from the hoof-plate.

As already explained, an important feature in my invention consists in so forming the flanges on the hoof-plate as to permit the extension of the shoe-plate to the extreme outer edge of the hoof-plate at the toe and at the heels. By means of this construction I am enabled to locate the toe calk or bearing on the shoe-plate at the extreme front end of the shoe, and in advance of the bolt or bolts by which the two plates are held together, and to locate the heel calks or bearings of the shoe-plate at the extreme outer and rear edges of the heels, so as to secure a wide base for the foot at its heels. In this way I am enabled to obtain the greatest possible separation between the toe and heel calks or bearings, and to give the foot the broadest possible base on which to stand, and am also enabled to locate the toe-calk as close as desired to the front edge of the hoof, in which position it is much better for and easier upon the horse when moving than if placed farther back from the front edge of the shoe.

The lower or shoe plate may be provided on its under side with sharp calks to prevent the horse from slipping on ice, or with mud-calks suitable for summer use, or, if preferred, may be made flat.

In order to properly hold together the two plates composing my duplex horseshoe, I make use of bolts (preferably three in number) passing through holes in one of the plates and screwing into corresponding threaded screw-holes in the other plate. The chief function of these bolts is to hold the two plates in close contact with each other, the construction otherwise being such as to relieve the bolts of all lateral strain or shock. This latter object I obtain in part by the fitting together of the raised flanges on the hoof-plate and the coinciding flanks or edges of the shoe-plate, and also, if desired, by the use of projecting hubs or bosses on one plate which interlock with coinciding recesses in the other plate, as explained below.

The interlocking hubs referred to in the preceding paragraph may be located upon either of the two plates forming the shoe; but I prefer to form them upon the hoof-plate, so as to secure a deeper screw-thread for the bolts, and to form the coinciding recess in the upper surface of the shoe-plate. By the engagement of the several hubs with the corresponding recesses each of the hubs acts as a dowel to prevent the relative displacement laterally of one plate upon the other, thus protecting and relieving the bolts from all lateral strain and shock to which they would otherwise be subjected; but I do not claim these hubs and recesses forming dowels to be new.

Where no protection is sought for the bolt-heads, I form the two plates as shown in Fig. 5, the projecting boss on the hoof-plate rising into but not entirely through the thickness of the shoe-plate, which latter is correspondingly recessed to fit over the boss or hub. The remaining thickness of the hoof-plate has a hole through it of which the diameter is less than that of the boss and than that of the bolt-head, so that when the bolt is tightened down the strain developed by it acts either to press the metal of the shoe-plate immediately under the bolt-head against the top of the hub on the hoof-plate, (if the two parts are so proportioned,) or, as is usually preferred, acts to press the two parts into contact at other suitable bearing-points, in which case the height of the hub is slightly less than the depth of the socket into which it fits. In this way I obtain a good fastening for the two parts of the duplex horseshoe, by means of which I obtain proper depth of screw-thread in a thin hoof-plate, the effective doweling of the two parts together, and a construction which dispenses with the need of a washer under the head of the screw or a large headed screw, one or the other of which would be required if the hole in the shoe-plate were throughout of a diameter large enough to fit over the hub on the hoof-plate, and neither of which would give as great strength and security to the bolt as the construction I employ.

Any form of bolt or bolt-head may be used; but I prefer one, as shown in Fig. 7, having a square head, which is the strongest form and the one best adapted to be acted upon by the wrench, and which acts most effectively by the compacting of dirt in the socket to prevent unscrewing of the bolt. Obviously bolts having other forms of heads may also be used.

An additional feature of the fastening employed is shown in Fig. 6, and consists either in sinking a socket in the shoe-plate to wholly or in part surround the bolt-head, or in raising a flange or thickening on the under side of the shoe-plate at this point, so as to produce such socket. In this way the head of the bolt is protected both from shock and from wear, and at the same time, when the bolt-head is square or of irregular form, greater security is obtained against the unscrewing of the bolt by reason of the accumulation and compacting of dirt in the recess thus formed, which is found practically to act as a lock-nut and to effectually prevent the jarring loose or unscrewing of the bolt until the compacted dirt is removed from the socket. The raised portion of the shoe-plate surrounding the bolt-head, by opposing an enlarged surface to wear, also increases the durability of the shoe and prevents the rapid wearing away of the bolt-head, so as to interfere with its easy removal by the wrench.

Briefly stated, the devices last described, when used in the complete form shown in the drawings, consist in so constructing the interlocking hubs and recesses of the two plates as to obtain on one axial line passing through or near the center of each hub the following important features, viz: A screw-thread deeper than the normal thickness of the hoof-plate; a projecting hub or dowel on the hoof-plate; a coinciding recess in the adjacent surface of the shoe-plate; a reduction in the diameter of the hole in the shoe-plate for a portion of its length to a size less than that of the hub on the hoof-plate and than that of the head of the bolt; a rim of metal rising above the normal thickness of the shoe-plate and partly or wholly surrounding the bolt-head, so as to form a protecting socket for the latter. The devices thus summarized may be used in connection with one or all of the bolts of the duplex horseshoe.

By means of the several devices above referred to, constructed and combined substantially as I have described, I am enabled to produce a duplex horseshoe in which all of the following advantages are secured, viz: It can be properly applied to the hoof without separating the two plates forming the shoe, and if any of the nails securing it to the foot become loose in use they can be tightened or replaced with new ones without separating the two plates; it strengthens and re-enforces the hoof-plate at the points where strength is most needed, and where it would otherwise be weakened by the nail-holes; it permits the toe-calk to be placed at the extreme forward point, where it is most useful and is in close proximity to one of the bolts; it permits the heel-calks to be placed as far apart from each other and from the toe-calk, as in the ordinary horseshoe; it utilizes the devices by which the foregoing results are obtained to secure the accurate registering together of the two plates at all times; it provides perfectly against the most severe strains or shocks tending to shift the plates relatively, and accomplishes this without permitting any of these strains or shocks to adversely affect the bolts; it affords adequate depth of screw-thread for the bolts, and a proper protection for the nail-heads in a shoe-plate of moderate thickness; it provides for so securely interlocking the shoe-plate with the hoof-plate and for supporting the former by the latter as to obtain a duplex horseshoe having a strength and solidity approximating to or equaling that of a common solid horseshoe, and yet exceeding the latter very little, if any, in weight; it provides a protection which wholly or in part surrounds the heads of the bolts, so that these heads are protected against shock and against wear, and by which, at the same time, the tendency of the bolts to unscrew is diminished.

Having thus described my improvements, what I claim as new, and desire to secure by Letters Patent, is the following:

1. A hoof-plate having on its outer edges raised flanges pierced with nail-holes, which flanges are separated from each other at the toe and terminate in the rear at a point forward of the heel of the shoe, substantially as described.

2. A duplex horseshoe composed of a hoof-plate having on its outer edges raised flanges pierced with nail-holes, said flanges being interrupted at the toe, and not extending to the heels, and a shoe-plate the outer edges of which register with the flanges on the hoof-plate, and may project between said flanges at the toe and at the heel to the full width of the shoe, substantially as described.

3. A duplex horseshoe having in combination a hoof-plate provided on its outer edges with raised flanges pierced with nail-holes, and a shoe-plate corresponding in periphery therewith, except where narrowed to correspond with the flanges of the hoof-plate, the said plates being secured together by one or more screw-bolts passing through interlocking hubs and recesses formed on the adjacent faces of the plates.

4. A duplex horseshoe having in combination a hoof-plate provided with raised flanges pierced with nail-holes, said flanges being interrupted at the toe and at the heel, and a metallic shoe-plate, shaped as described, provided with calks or bearings which are integral therewith, and which project between and past said flanges on the outer edges of the hoof-plate, both at the toe and at the heels, whereby the greatest separation of the calks or bearings may be obtained which the length of the shoe permits.

5. A duplex horseshoe having in combination a hoof-plate provided with raised flanges pierced with nail-holes, and a metallic shoe-plate, shaped as described, provided with one or more calks or bearings integral therewith, said shoe-plate projecting by and between the flanges on the hoof-plate to the outer edge of the latter, both at the toe and at the heels, the two plates composing the shoe being registered and held together by one or more interlocking hubs and recesses on their adjacent surfaces and by one or more bolts, substantially as described.

In testimony whereof I have hereunto subscribed my name.

ARNOLD C. HAWES.

Witnesses:
C. C. WARDLOW,
W. T. HARRIS.